May 11, 1965    R. H. HAMILTON    3,182,489
ULTRASONIC CONTAMINANT DETECTING
Filed Oct. 22, 1962
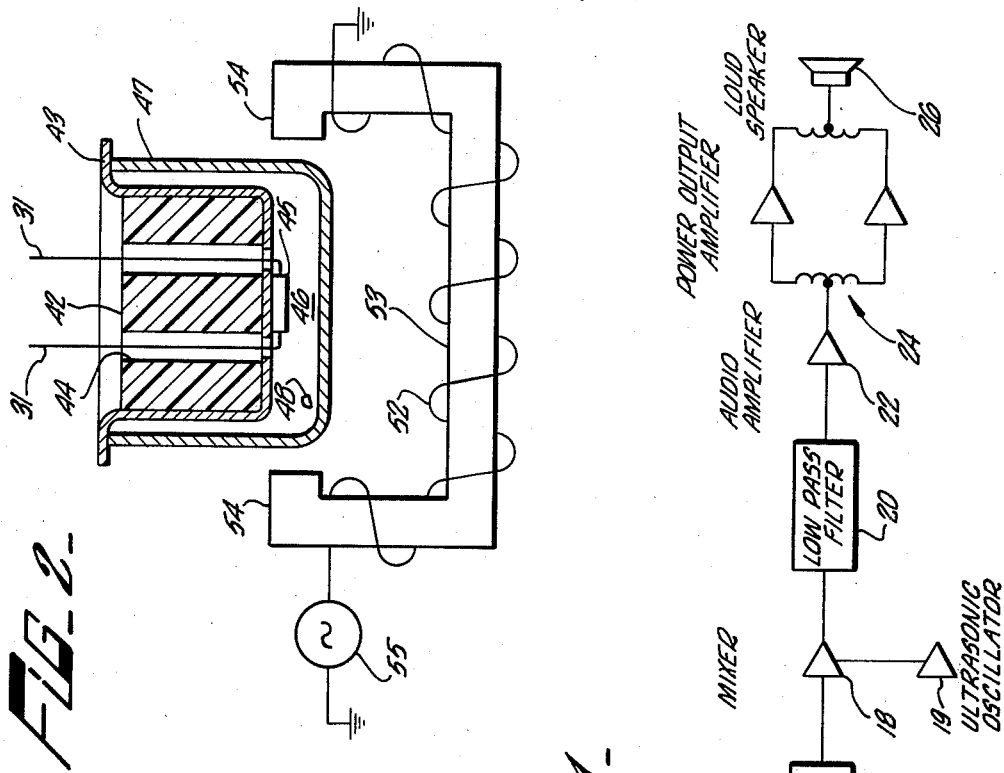
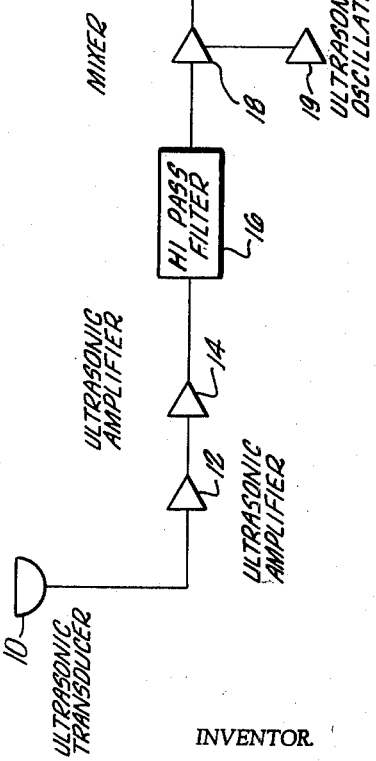
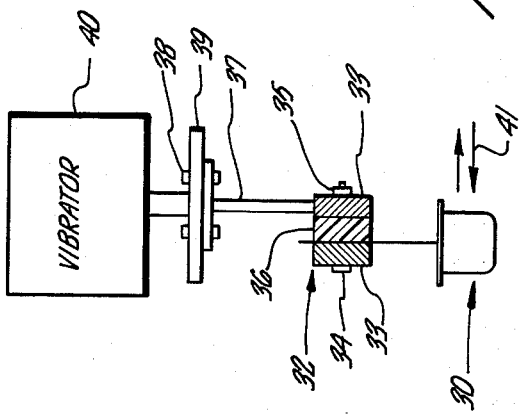
INVENTOR.
ROBERT H. HAMILTON
BY
*Christie, Parker & Hale*
ATTORNEYS.

3,182,489
ULTRASONIC CONTAMINANT DETECTING
Robert H. Hamilton, Menlo Park, Calif., assignor to Delcon Corporation, Palo Alto, Calif., a corporation of California
Filed Oct. 22, 1962, Ser. No. 231,953
14 Claims. (Cl. 73—67)

This invention relates to apparatus and methods for testing articles which emit ultrasonic energy when vibrated.

There are many types of articles which, after their manufacture or assembly, require testing to determine if they are properly made. If the articles are improperly assembled, they will often emit characteristic sounds in the ultrasonic frequency range when vibrated. Examples are wrist watches, resistors, capacitors, vacuum tubes, transistors, ceramic tubes, electrical connectors, relays, and crystal transducers. Although the invention is applicable to all of these aticles, and many others, it is described with specific reference to testing transistors for the presence of particulate contaminants which would interfere with proper operation.

Transistors are well known solid state devices which perform the electrical functions of vacuum tubes. A typical transistor includes a semiconductor element mounted in a case. Electrical leads are attached to the semiconductor element so that it can be connected in a circuit. Occasionally in assembling a transistor, a particulate contaminant, say a fragment of glass or ferromagneic material such as an iron filing, is trapped in a space between the case and the semiconductor element. If the transistor is installed in a circuit subject to vibration and acceleration, say in a missile or other air-borne equipment, the loose contaminant often acts as a battering ram and damages either the semiconductor element, or the connections of the electrical leads to it, thus causing malfunction of the transistor.

Numerous attempts have been made to develop satisfactory inspection techniques to detect contaminated transistors, but none of them have been entirely satisfactory. For example, X-ray has been used, but it is expensive, time-consuming, and fails to detect contaminants which have approximately the same density as the components used in assembling the transistors. Moreover, it is generally not feasible to test a large number of transistors simultaneously by X-ray. This invention provides a simple, fast, inexpensive system for testing one or many articles simultaneouly which emit ultrasonic energy when vibrated. For example, I have discovered that when a transistor with a particulate contaminant is vibrated, there often is no readily discernible evidence of the presence of the contaminant. However, ultrasonic mechanical vibrations are produced due to the relative motion between the contaminant and the transistor. Apparently when the small contaminant strikes the transistor housing, it vibrates, and causes the housing to vibrate, in the ultrasonic range. U.S. Patent No. 2,601,779 discusses the generation of ultrasonic wave in solids subject to shock impact. Use is made of this phenomenon to test transistors and other articles such as those mentioned above.

In terms of method, the invention includes the steps of testing an article by vibrating it to cause it to emit ultrasonic energy, and converting the ultrasonic energy into a form which can be perceived by an observer. Conveniently, the ultrasonic energy is converted into audible sound. The presently preferred method for doing this is to convert the ultrasonic energy into electrical energy, and thereafter convert the electrical energy into audible sound. For example, the ultrasonic energy is converted into a first alternating electrical signal with a frequency similar to that of the ultrasonic energy. A second alternating electrical signal of a frequency differing from the first by an amount in the audible range, say 2,000 to 12,000 cycles per second, is mixed with the first signal to develop a third signal which is of a frequency equal to the difference between the first and second signals, and therefore in the audio range. The third signal is thereafter converted to audible sound so it may easily be detected by an observer. Of course, the ultrasonic vibrations from the article need not be converted to audible sound. Instead, they may be detected electronically and converted into a signal which operates automatic equipment to reject a defective article on an assembly line.

Preferably, the article is vibrated at a frequency of 20 to 1,000 cycles per second to produce an acceleration of 5 to 50 times that of gravity. For best results, the article is vibrated through an amplitude at least equal to the maximum dimension of the article in the direction of vibration. For articles such as transistors, an amplitude of $1/64$ inch to $1/2$ inch is usually adequate. When the contaminant is a ferromagnetic particle, e.g., an iron filing, an alternating magnetic field is used to vibrate the contaminant with respect to the article and produce ultrasonic mechanical vibration.

In terms of apparatus, the invention includes means for vibrating an article to cause it to emit ultrasonic energy. Means are provided for receiving the ultrasonic energy and converting it into a form perceptible by an observer. Preferably, means are included for converting the ultrasonic energy into an electrical signal, and means are provided for converting the electrical signal into sound energy in the audible range.

Preferably, the vibrating means can vibrate the article from 20 to 1,000 cycles per second with an acceleration of 5 to 50 times that of gravity and through an amplitude of $1/64$ inch to $1/2$ inch. Many of the articles tested in accordance with this invention emit ultrasonic energy in the range of 30 to 50 kilocycles and therefore I prefer to use transducers specifically selected to convert sound energy in this range to electrical energy.

These and other aspects of the invention will be more fully understood from the following detailed description and the accompanying drawings, in which:

FIG. 1 is a schematic diagram of a system for testing transistors in accordance with this invention; and FIG. 2 is an enlarged schematic sectional view of transistors being tested with an alternating electromagnetic field.

Referring to FIG. 1, a conventional ultrasonic transducer 10 has its outlet coupled to a first ultrasonic amplifier 12 connected in cascade arrangement with a second ultrasonic amplifier 14. The output from the second amplifier goes through a high-pass filter 16 which is designed to reject substantially all of the signals in the frequency range below about 15,000 c.p.s. The high frequency portion of the signal going through the high-pass filter is fed into a mixer 18 which also receives the output of an ultrasonic oscillator 19. Preferably, the ultrasonic oscillator has a frequency which differs from the incoming frequency from the high-pass filter by about 3,000 to about 5,000 c.p.s. The resulting family of frequencies from the mixer is subjected to a low-pass filter which removes all frequencies with the exception of those below about 5,000 c.p.s. In other words, only the lower side band of the mixed signal goes through the low-pass filter.

The low frequency signal from the low-pass filter passes through an audio amplifier 22, and then through a power output amplifier stage 24, which drives a conventional loudspeaker 26.

The ultrasonic transducer can be of any conventional type, but preferably it is fairly selected to ultrasonic vibrations and rejects substantially all of the vibrations below about 20,000 c.p.s. Preferably, the ultrasonic transducer receives sound vibrations in the range of 30 to 50 kc. and has a peak response of 40 kc. In this case, the high-pass filter may be omitted since only ultrasonic frequency signals are generated by the transducer. Another technique for rejecting frequencies in the audible range is the use of a balanced modulator circuit in place of the conventional mixer circuit. As is well known, the conventional balanced mixer rejects the oscillator frequency, signal frequency from the transducer, any audio frequencies from the transducer, but passes both side bands. The upper side band is subsequently removed or rejected by low-pass filter. The rejection of all frequencies in the audible range is useful in making the system selectively sensitive to ultrasonic vibrations and to eliminate the background noises in the audible range.

An article 30, say a transistor, under test is secured by its leads 31 in the inverted position shown in FIG. 1 in a clamp 32, which includes a pair of parallel plates 33 held together by a bolt 34 and nut 35. A resilient pad 36 of any suitable material, say rubber, is sandwiched between the plates to bear against the electrical leads. One of the plates includes an upwardly extending bracket 37 which is secured by screws 38 to a platform 39 of a conventional vibrator 40. Preferably, the vibrator is adjustable to vibrate the clamp in the direction shown by arrows 41 through an amplitude of $1/64$ to $1/2$ inch, and in the frequency range of 20 to 1,000 c.p.s. Ordinarily, this will subject an article secured in the clamp to an acceleration between 5 and 50 times that of gravity, depending on how tightly the article is clamped between the resilient pad. If greater acceleration is required, the clamp is tightened. If less acceleration is needed, the clamp is loosened.

As shown best in FIG. 2, a typical transistor includes an insulating header 42 mounted in a holder 43. The header includes bores 44 through it to receive the electrical leads 31 which are attached to a conventional semiconductor element 45 mounted on the holder 43 in a space 46 between the holder and a cover or can 47 disposed over the semiconductor element to protect it. The space 46 is about $1/16$ inch high as viewed in FIG. 2, and sometimes may include a contaminant 48, such as a particle of glass or ferromagnetic material. The contaminant is free to bang around inside space 46, when the transistor is subjected to vibration or other forms of acceleration, and is likely to cause damage either to the semiconductor element, or to the connections between the element and the electrical leads. The relative movement between the contaminant and the transistor generates mechanical vibrations, most of which, if not all, are in the ultrasonic range. Any of the vibrations which may be in the audio range is usually inaudible or masked by background noise.

In using the system shown in FIG. 1, the transistor is clamped in the position shown so that any contaminant particles will rest on the bottom of the cover 47. In this way, any particle in the transistor is most likely to generate the maximum noise when vibrated. The vibrator is turned on and set to the frequency and amplitude to provide the desired acceleration. I have found that good results are obtained when the article is vibrated through an amplitude equal to or slightly greater than the maximum dimension of the space in which the contaminant may be located in the direction of vibration. For example, if a transistor of the type shown in FIG. 2 has a diameter of $1/16$ inch, the amplitude of the vibration is made equal to or slightly greater than $1/16$ inch. Many specifications require that the transistor withstand vibration which produces an acceleration equal to 25 times that of gravity. Accordingly, it is desirable to test in this range.

In using the system shown in FIG. 1, the ultrasonic transducer is aimed in the general direction of the vibrating article. Of course, a large number of articles can be clamped and vibrated simultaneously. For example, 50 transistors have been clamped in the manner shown in FIG. 1 and vibrated together. Usually, all or most of the transistors are free of contaminants, and therefore do not emit ultrasonic noise. Therefore, the transducer is used to scan the bank of articles to determine if any are defective. Those which may emit ultrasonic noise are easily detected because the transducer picks up a signal of maximum intensity when it is nearest the defective article. Any ultrasonic vibration picked up by the transducer is converted into an electrical signal in the ultrasonic frequency range. To provide adequate sensitivity to ultrasonic noises, the transducer output is amplified by the ultrasonic amplifiers. Following this amplification, the signal is subjected to the high-pass filter which has a severe rejection to all frequencies below about 20,000 c.p.s. This prevents any spurious audio frequency being transmitted through the circuit. The ultrasonic signal is then heterodyned with the output from the ultrasonic oscillator in the mixer. Only the lower side band frequency goes through the low-pass filter of the audio amplifier, and it is amplified in the power output stage and converted into audible noise by the loudspeaker. Thus, it is possible to "hear" the ultrasonic vibrations produced in the vibrating article.

If the contaminant particle is ferromagnetic in nature, then the particle itself is vibrated as shown in FIG. 2 by conventional alternating electromagnetic field, thereby avoiding the necessity of vibrating the entire article. The magnetic field is produced by a coil 52 wound around a yoke 53 of magnetic material and having pole pieces 54 on opposite sides of the transistor. Power is supplied to the coil from a source 55 of alternating current.

I claim:

1. Apparatus for testing an article which includes a part movable with respect to the rest of the article, the part generating mechanical vibrations in the ultrasonic range when moved with respect to the article, the apparatus comprising vibrating means for producing relative movement of the article and part whereby the part strikes the article and generates vibrations in the ultrasonic range, and means for converting the ultrasonic vibrations to a form perceptible by an observer.

2. Apparatus for testing an article which includes a part movable with respect to the rest of the article, the part generating mechanical vibrations in the ultrasonic range when moved with respect to the article, the apparatus comprising vibrating means for producing relative movement of the article and part whereby the part strikes the article and generates vibrations in the ultrasonic range, and means for converting the ultrasonic vibrations to audible sound.

3. Apparatus for testing an article which includes a part movable with respect to the rest of the article, the part generating mechanical vibrations in the ultrasonic range when moved with respect to the article, the apparatus comprising vibrating means for producing relative movement of the article and part whereby the part strikes the article and generates vibrations in the ultrasonic range, means for converting the ultrasonic vibrations to an electrical signal, and means for converting the electrical signal to a form perceptible by an observer.

4. Apparatus for testing an article which includes a ferromagnetic part movable with respect to the rest of the article, the part generating mechanical vibrations in the ultrasonic range when moved with respect to the article, the apparatus comprising electromagnetic vibrating means for moving the part relative to the article whereby the part strikes the article and generates vibrations in the ultrasonic range, means for converting the ultrasonic vibrations to an electrical signal, and means for converting the electrical signal to a form perceptible by an observer.

5. Apparatus for testing an article which includes a part movable with respect to the rest of the article and which generates ultrasonic vibrations when vibrated, the apparatus comprising vibrating means for vibrating the article at about 20 to about 1,000 cycles per second to cause relative movement of the article and part whereby the part strikes the article and generates ultrasonic vibrations, means for receiving the ultrasonic vibrations and converting them into an electrical signal, and means for converting the electrical signal into sound energy in the audible range.

6. Apparatus for testing an article which includes a part movable with respect to the rest of the article and which generates ultrasonic vibrations when vibrated, the apparatus comprising vibrating means for vibrating the article to an acceleration between about 5 and about 50 times that of gravity to produce relative movement of the article and part whereby the part strikes the article and generates ultrasonic vibrations, means for receiving the ultrasonic vibrations and converting them into an electrical signal, and means for converting the electrical signal into sound energy in the audible range.

7. Apparatus for testing an article which includes a part movable with respect to the rest of the article and which generates ultrasonic vibrations when vibrated, the apparatus comprising vibrating means for vibrating the article through an amplitude at least equal to the maximum dimension of the article in the direction in which it is vibrated to produce relative movement of the article and part whereby the part strikes the article and generates ultrasonic vibrations, means for receiving the ultrasonic vibrations and converting them into an electrical signal, and means for converting the electrical signal into sound energy in the audible range.

8. Apparatus for testing an article which includes a part movable with respect to the rest of the article and which generates ultrasonic vibrations when vibrated, the apparatus comprising vibrating means for vibrating the article through an amplitude between about $\frac{1}{64}$ inch to about $\frac{1}{2}$ inch to produce relative movement of the article and part whereby the part strikes the article and generates ultrasonic vibrations, means for receiving the ultrasonic vibrations and converting them into an electrical signal, and means for converting the electrical signal into sound energy in the audible range.

9. A method for testing an article which includes a part movable with respect to the rest of the article and which generates ultrasonic vibrations when vibrated, the method comprising the steps of vibrating the article at about 20 to about 1,000 cycles per second to produce relative movement of the article and part whereby the part strikes the article and generates ultrasonic vibrations, and converting the ultrasonic vibrations into audible sound.

10. A method for testing an article which includes a part movable with respect to the rest of the article and which generates ultrasonic vibrations when vibrated, the method comprising the steps of vibrating the article to subject it to acceleration between about 5 and about 50 times that of gravity and cause it to produce relative movement of the article and part whereby the part strikes the article and generates ultrasonic vibrations, and converting the ultrasonic vibrations into audible sound.

11. A method for testing an article which includes a part movable with respect to the rest of the article and which generates ultrasonic vibrations when vibrated, the method comprising the steps of vibrating the article through an amplitude between about $\frac{1}{64}$ inch and about $\frac{1}{2}$ inch to produce relative movement of the article and part whereby the part strikes the article and generates ultrasonic vibrations, and converting the ultrasonic vibrations into audible sound.

12. A method for testing an article which includes a part movable with respect to the rest of the article and which generates ultrasonic vibrations when vibrated, the method comprising the steps of vibrating the article through an amplitude greater than the dimension of the article in the direction of vibration to produce relative movement of the article and part whereby the part strikes the article and generates ultrasonic vibrations, and converting the ultrasonic vibrations into audible sound.

13. A method for testing a transistor having outwardly extending leads and a part movable with respect to the transistor when vibrated, the method comprising the steps of orienting the transistor so the leads extend upwardly, vibrating the transistor and part back and forth to cause relative movement of the transistor and part whereby the part strikes the transistor and generates ultrasonic vibrations, and converting the ultrasonic vibrations into a form which is perceptible to an observer.

14. A method for testing a transistor for the presence of a foreign part movable with respect to the transistor when vibrated, the method comprising the steps of vibrating the transistor and foreign part back and forth to cause relative movement of the transistor and part whereby the foreign part strikes the transistor and generates ultrasonic vibrations, and converting the ultrasonic vibrations into a form which is perceptible to an observer.

References Cited by the Examiner

UNITED STATES PATENTS

| | | | |
|---|---|---|---|
| 1,236,067 | 8/17 | Dodds | 73—69 |
| 2,208,202 | 7/40 | Stanton et al. | 73—69 X |
| 3,016,457 | 1/62 | Brown et al. | 73—69 X |

RICHARD C. QUEISSER, *Primary Examiner.*

JOHN BEAUCHAMP, *Examiner.*